US012809142B2

(12) United States Patent
Tashiro

(10) Patent No.: US 12,809,142 B2
(45) Date of Patent: Nov. 24, 2026

(54) DISPLAY APPARATUS

(71) Applicant: CANON KABUSHIKI KAISHA, Tokyo (JP)

(72) Inventor: Yoshihisa Tashiro, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 325 days.

(21) Appl. No.: 18/780,674

(22) Filed: Jul. 23, 2024

(65) Prior Publication Data

US 2025/0035899 A1 Jan. 30, 2025

(30) Foreign Application Priority Data

Jul. 28, 2023 (JP) ................................ 2023-123561

(51) Int. Cl.
*G02B 17/08* (2006.01)

(52) U.S. Cl.
CPC ..... *G02B 17/0856* (2013.01); *G02B 17/0884* (2013.01)

(58) Field of Classification Search
None
See application file for complete search history.

(56) References Cited

U.S. PATENT DOCUMENTS 8,854,504 B2 10/2014 Tashiro
10,126,523 B2 11/2018 Tashiro
11,325,330 B2 * 5/2022 Wong ............... B29D 11/00644
11,327,274 B2 5/2022 Tashiro
11,803,062 B1 * 10/2023 Huang ............... G02B 27/0172
2013/0308181 A1 * 11/2013 Nakano .............. G02B 17/0824 359/365
2013/0342749 A1 12/2013 Tashiro
2014/0226203 A1 * 8/2014 Nakano .............. G02B 17/0856 359/728
2020/0064592 A1 * 2/2020 Tashiro .............. G02B 27/0075
2023/0185094 A1 6/2023 Tashiro
2023/0375765 A1 11/2023 Tashiro
2024/0393594 A1 11/2024 Tashiro

FOREIGN PATENT DOCUMENTS

JP 2019-148627 A 9/2019

* cited by examiner

*Primary Examiner* — Robert E. Tallman
(74) *Attorney, Agent, or Firm* — Carter, DeLuca & Farrell LLP

(57) ABSTRACT

A display apparatus includes a display element, a display optical system configured to guide light from a display surface of the display element to an observation side, and two optical elements. The display optical system includes a first and second half-transmissive reflective surface and a second half-transmissive reflective surface. The light from the display surface transmits through the second half-transmissive reflective surface, is reflected on the first half-transmissive reflective surface, is reflected on the second half-transmissive reflective surface, transmits through the first half-transmissive reflective surface, and is guided to the observation side. An absolute value of a curvature of the second half-transmissive reflective surface is larger than that of the first half-transmissive reflective surface. The display surface has a convex shape toward the observation side in at least one of two mutually orthogonal sections that include an optical axis of the display optical system.

13 Claims, 7 Drawing Sheets

DISPLAY APPARATUS

BACKGROUND

Technical Field

One of the aspects of the embodiments relates to a display optical system suitable for an image display apparatus such as a head mount display (HMD) that enlarges and displays an original image displayed on a display element.

Description of Related Art

The display apparatus is demanded to have a reduced size and a wide angle of field. Japanese Patent Laid-Open No. 2019-148627 discloses a display optical system using a reflective surface that has a reduced size and a wide angle of field. This display optical system achieves both a wide angle of field (high magnification) and a reduced thickness using a triple-pass configuration and two reflective surfaces that reflect light from a display element (display surface).

In the display optical system disclosed in Japanese Patent Laid-Open No. 2019-148627, an optical material of the lens is selected so that the Petzval curvature of field occurring at the reflective surfaces (concave mirror) is offset by the Petzval curvature of field occurring at the refractive surfaces. Thereby, the entire optical system can correct curvature of field to support a flat display surface.

The ranges of refractive index and Abbe number of optical materials are limited, and in a case where optical materials are selected with priority given to the Petzval sum correction, it may become difficult to correct chromatic aberration. The lateral chromatic aberration can be reduced by electronically correcting an image on the display element.

In displaying a high-definition image with a high spatial frequency, optical performance deteriorates due to lateral chromatic aberration within each RGB color channel. Moreover, it is difficult to electronically correct longitudinal chromatic aberration.

It is difficult for the display optical system disclosed in JP 2019-148627 to provide a strong light condensing effect to the reflective surface in order to balance curvature of field and chromatic aberration, and the attempt at the high magnification and reduced size of the optical system has its limits. In addition, since the display optical system includes a single cemented lens consisting of a plano-convex lens and a plano-concave lens via a reflective surface disposed between them, the correction of astigmatism also has its limits.

SUMMARY

A display apparatus according to one aspect of the disclosure includes a display element, a display optical system configured to guide light from a display surface of the display element to an observation side, and two optical elements. The display optical system includes a first half-transmissive reflective surface and a second half-transmissive reflective surface disposed on a cemented surface of the two optical elements. The light from the display surface transmits through the second half-transmissive reflective surface, is reflected on the first half-transmissive reflective surface, is reflected on the second half-transmissive reflective surface, transmits through the first half-transmissive reflective surface, and is guided to the observation side. An absolute value of a curvature of the second half-transmissive reflective surface is larger than an absolute value of a curvature of the first half-transmissive reflective surface. The display surface has a convex shape toward the observation side in at least one of two mutually orthogonal sections that include an optical axis of the display optical system.

Further features of various embodiments of the disclosure will become apparent from the following description of embodiments with reference to the attached drawings.

DESCRIPTION OF THE EMBODIMENTS

Figure 1:
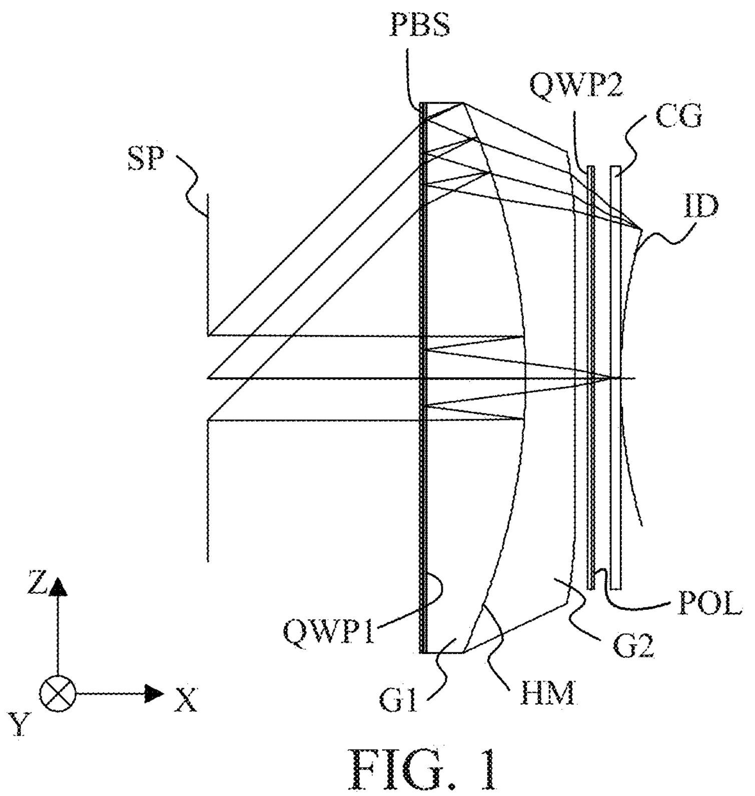
FIG. 1 is a ZX sectional view of a display optical system according to Example 1.
Figure 2:
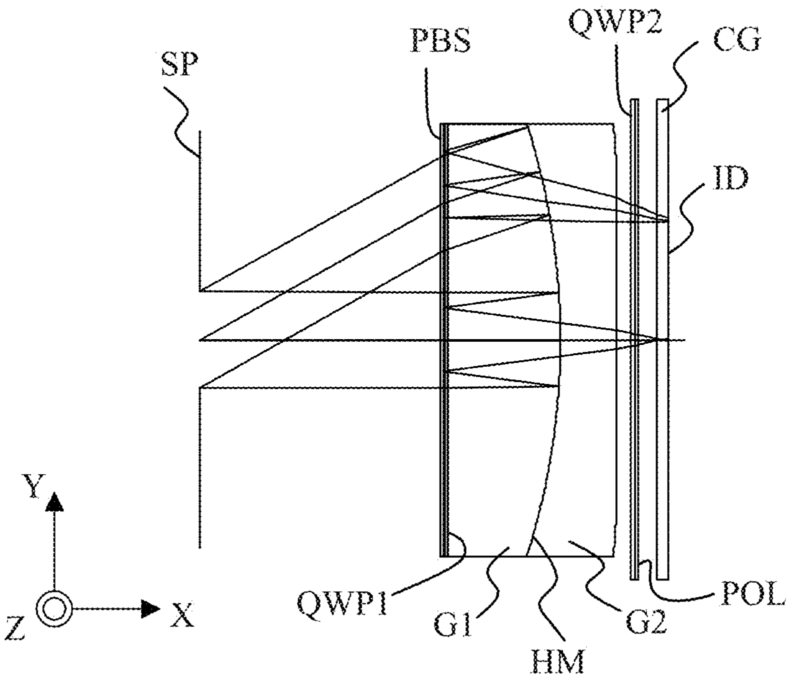
FIG. 2 is a YX sectional view of the display optical system according to Example 1.

Examples of the present disclosure will be described below with reference to the drawings. First, before display apparatuses according to Examples 1 to 5 are described in detail, common matters to each example will be explained. FIGS. 1 and 2 illustrate a ZX section and an XY section of the display apparatus according to Example 1. FIGS. 5, 7, 9 and 11 illustrate YX sections of the display apparatuses according to Examples 2 to 5, respectively.

The display apparatus according to each example includes a display element and a display optical system, and enlarges and displays an image displayed on a display surface ID of the display element toward a pupil plane SP on the observation side. The display optical system has a configuration in which a folded optical path (triple path) is formed by internal reflections twice. More specifically, the display optical system includes, in order from the pupil side (observation side) to the display element side, a first half-transmissive reflective surface PBS, a first quarter waveplate (λ/4) QWP1, a first lens G1, a second half-transmissive reflective surface HM, a second lens G2, a second quarter waveplate QWP2, and a polarizing plate POL. The pupil plane SP is an observation surface, and the pupil of an observer is placed here.

The first half-transmissive reflective surface PBS includes, for example, a wire grid polarizer, and reflects linearly polarized light in the same polarization direction as that of the linearly polarized light passing through the polarizing plate POL, and transmits linearly polarized light in a polarization direction perpendicular to this. In the wire grid polarizer, a surface on which the wire grid is formed functions as a half-transmissive reflective surface.

The first quarter waveplate QWP1 and the second quarter waveplate QWP2 are arranged such that their respective slow axes are tilted at 90° (90 degrees) from each other. The slow axis of the first quarter waveplate QWP1 is tilted at 45° relative to the polarization transmission axis of the polarizing plate POL. The second half-transmissive reflective surface HM is a half-mirror formed, for example, by a dielectric multilayer film or metal vapor deposition. The display element can use a liquid crystal display element (LCD), an organic EL element, or the like. CG represents a cover glass that covers a display surface (screen) ID of the display element.

Figure 13:
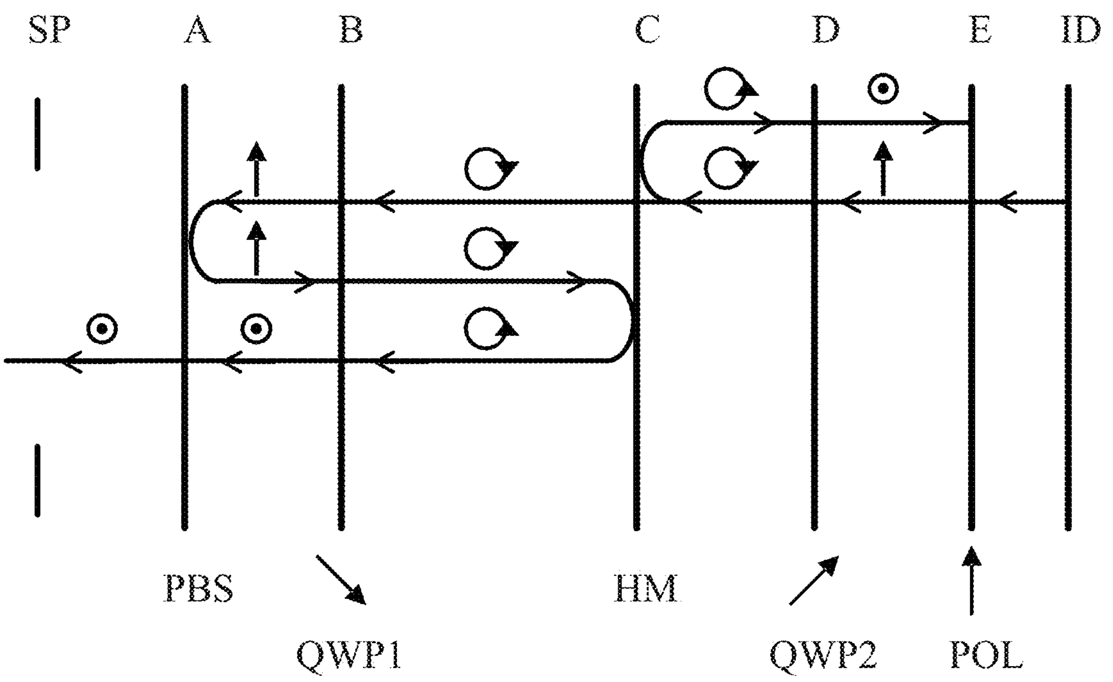
FIG. 13 illustrates an optical path using polarization.

FIG. 13 illustrates the use of polarized light in the display optical system according to each example. Of the light emitted from the display surface ID, linearly polarized light parallel to the polarization transmission axis of the polarizing plate POL (E) transmits through the polarizing plate POL, is converted into circularly polarized light by the second quarter waveplate QWP2 (D), and enters the half-transmissive reflective surface HM (C). A portion of the light that has reached the second half-transmissive reflective surface HM is reflected, becomes circularly polarized light in the opposite direction to that before reflection, and returns to the second quarter waveplate QWP2. The reverse circularly polarized light that has returned to the second quarter waveplate QWP2 is converted by the second quarter waveplate QWP2 into linearly polarized light in a polarization direction perpendicular to the polarization direction when it first transmits through the polarizing plate E, then returns to the polarizing plate POL, is absorbed by the polarizing plate POL.

On the other hand, the light that has reached and transmitted through the second half-transmissive reflective surface HM is converted by the first quarter waveplate QWP1 (B) into linearly polarized light in the same polarization direction as that when it transmits through the polarizing plate POL, and enters the first half-transmissive reflective surface PBS (A). The linearly polarized light incident on the first half-transmissive reflective surface PBS is reflected by the polarization selectivity of the first half-transmissive reflective surface PBS, is converted into circularly polarized light in a direction opposite to that of the circularly polarized light that is first emitted from the second quarter waveplate QWP2 by the first quarter waveplate QWP1, and enters the second half-transmissive reflective surface HM.

The circularly polarized light incident on the second half-transmissive reflective surface HM is reflected by the second half-transmissive reflective surface HM and converted into circularly polarized light in the opposite direction to that before reflection. The light then enters the first quarter waveplate QWP1, is converted into linearly polarized light in a polarization direction perpendicular to the polarization direction of the linearly polarized light that first transmits through the polarizing plate POL, and enters the first half-transmissive reflective surface PBS. The linearly polarized light incident on the first half-transmissive reflective surface PBS transmits through the first half-transmissive reflective surface PBS due to the polarization selectivity of the first half-transmissive reflective surface PBS described above, and reaches the pupil plane SP.

By using polarization as described above, the light emitted from the display surface (screen) ID is guided to the pupil plane SP through a triple path in which the light transmits through the second half-transmissive reflective surface HM, is reflected by the first half-transmissive reflective surface PBS, is reflected by the second half-transmissive reflective surface HM, and transmits through the first half-transmissive reflective surface PBS.

A description will now be given of the characteristics of the display optical system according to each example. The display optical system employs a triple-pass configuration using two half-transmissive reflective surfaces (the first half-transmissive reflective surface PBS and the second half-transmissive reflective surface HM), and one cemented optical element in which two optical elements (first and second half-transmissive reflective surfaces G1 and G2) are cemented. The half-transmissive reflective surface (second half-transmissive reflective surface) having a larger curvature (absolute value) of the two half-transmissive reflective surfaces is disposed on the cemented surface of the cemented lens. The display surface of the display element has a convex shape toward the observation side in at least one of the two sections (ZX section and XY section) that include the optical axis and are orthogonal to each other.

Each example reduces the thickness of the display optical system using the triple-pass configuration. One of the two half-transmissive reflective surfaces, which shares the main optical power (reciprocal of the focal length) of the entire display optical system is disposed on the cemented surface. This configuration avoids total reflection on the half-transmissive reflective surface, which becomes a problem in a case where a high magnification of the display optical system is sought. Furthermore, since the cemented surface has a low risk of exposure to the external environment, it is beneficial in environmental resistance in a case where a half-mirror made of a metal film or dielectric multilayer film is used as the half-transmissive reflective surface.

Here, in an attempt at a high magnification of the display optical system, it is effective to increase the optical power of the half-transmissive reflective surface, that is, to give the half-transmissive reflective surface a larger curvature (absolute value). At this time, the problem of total reflection can be avoided by placing a half-transmissive reflective surface on the cemented surface. However, it becomes difficult to correct the Petzval sum in the entire optical system, and curvature of field remains. Compensating for the remaining curvature of field using a display element having a display surface formed into a convex curved surface toward the observation side can realize a display optical system having excellent optical performance over the entire display screen.

A known method for realizing a curved display surface is to process an end surface of a fiber optics plate (FOP) into a curved surface. In addition, another known example is to convert the display surface into a cylindrical or foldable shape using a technique for a flexible process of LCD or OLED. Here, the use of a display element such as an LCD or OLED having a curved display surface is better in view of resolution and cost than using an FOP.

Still another known example is a combination of a curved display surface and a display optical system including a dioptric optical system. In this example, the main optical power of the entire optical system is shared by the refractive surface. On the other hand, the display optical system according to each example is different in that the main optical power of the entire optical system is borne by the reflective surface. Since the signs of the Petzval terms generated on the refractive surface and the reflective surface are opposite, the signs of the generated curvature of field are also opposite. Therefore, in the combination of the curved display surface and the display optical system including the dioptric optical system, the curved direction of the display surface may be convex toward the display optical system side.

As described, each example realizes a display apparatus having a reduced size and a wide angle of field using a display optical system having both a high magnification and a reduced thickness to achieve high optical performance, and a display element having a curved display surface.

In each example, the two optical elements cemented at the cemented surface provided with the half-transmissive reflective surface are made of a resin material. Using a resin material for the optical element is better in terms of weight reduction than using a glass material.

In the above configuration, fG1 is a focal length of a first optical element in air, which is calculated from a radius of curvature of a reference spherical surface of the first optical element (G1) disposed on the observation side of the two optical elements (where a radius of curvature of the reference spherical surface will be referred to as a reference radius of curvature). fG2 is a focal length of a second optical element (G2) in air, which is calculated from the reference radius of curvature of the second optical element (G2) disposed on the display element side of the two optical elements. Ndp is a refractive index for the d-line of the optical element having a positive focal length of the two optical elements. vdp is an Abbe number based on the d-line of the optical element having the positive focal length of the two optical elements. Rhm is a reference radius of a curvature of the half-transmissive reflective surface (second half-transmissive reflective surface) that has a larger curvature (absolute value) among the two half-transmissive reflective surfaces. f is a focal length of the entire display optical system. Rp is a reference radius of curvature of the display surface. The reference radii of curvature of each an optical element and a half-transmissive reflective surface is a radius of a reference spherical surface determined by a surface vertex on the optical axis and a maximum optical effective diameter (effective diameter). The reference radius of curvature of the display surface is a minimum value of a radius of curvature (absolute value) of a reference spherical surface determined by the surface vertex on the optical axis and the end of the effective area of the display surface.

Then, the display optical system according to each example may satisfy at least one of the following inequalities (1) to (5):

$$fG1/fG2<0 \tag{1}$$

$$1.4\leq Ndp<Ndn\leq 1.9 \tag{2}$$

$$1.0<vdp/vdn\leq 4.0 \tag{3}$$

$$1.0<|Rhm|/f\leq 5.0 \tag{4}$$

$$0.1\leq |Rhm|/|Rp|\leq 2.0 \tag{5}$$

Inequality (1) defines a proper ratio of the focal lengths of the positive lens and the negative lens in a case where the half-transmissive reflective surface is provided to the cemented surface in the two optical elements that form a cemented lens consisting of the positive lens and the negative lens. The cemented lens consisting of the positive lens and the negative lens can correct the chromatic aberration that occurs on the refractive surface of the cemented lens. In a case where fG1/fG2 becomes higher than the upper limit of inequality (1), both of the two optical elements become positive lenses or negative lenses, and achromatization is not achieved. Although the lower limit is not set in inequality (1), in a case where fG1/fG2 becomes too small, the optical power becomes too biased toward one lens, which is disadvantageous for correcting chromatic aberration. The cemented surface may have a convex shape toward the display element side. Disposing the half-transmissive reflective surface in a concentric shape relative to the pupil plane is beneficial to astigmatism correction. At this time, the lens on the observation side may be a positive lens and the lens on the display element side may be a negative lens.

Inequality (2) defines a proper relationship and ranges of the refractive indices of the two optical elements. The refractive index of the positive lens smaller than the refractive index of the negative lens can facilitate a selection of a low dispersion material for the positive lens and a high dispersion material for the negative lens. This refractive index configuration is not beneficial to compensating for the Petzval term generated at the reflective surface (concave mirror) using the Petzval term generated at the refractive surface. However, the display optical system according to each example combined with a display element having a curved display surface may have a configuration that prioritizes correction of chromatic aberration over correction of curvature of field. In a case where Ndp or Ndn becomes lower than the lower limit of inequality (2), the refractive index of the optical element becomes too low, and it becomes difficult to correct monochromatic aberration such as spherical aberration. In a case where Ndp or Ndn becomes higher than the upper limit of inequality (2), the refractive index of the optical element becomes too high. Then, a material with a high specific gravity must be selected as the optical material, and it becomes difficult to reduce the weight of the display optical system.

Inequality (3) defines a proper range for a ratio of the Abbe numbers of the two optical elements. Selecting a low-dispersion material for the positive lens and a high-dispersion material for the negative lens to provide the cemented lens with an achromatic configuration can correct longitudinal chromatic aberration and lateral chromatic aberration. Achromatization in the lens is important for a display optical system with a triple-pass configuration because chromatic aberration does not occur on the reflective surface. In a case where vdp/vdn becomes lower than the lower limit of inequality (3), the Abbe number of the positive lens becomes much smaller than the Abbe number of the negative lens, and chromatic aberration becomes insufficiently corrected. In a case where vdp/vdn becomes higher than the upper limit of inequality (3), the Abbe number of the positive lens becomes much larger than the Abbe number of the negative lens. In this case, a material with an extremely low refractive index must be selected for the positive lens, or a material with extremely high dispersion must be selected for the negative lens, and correction of monochromatic aberration and reduction of transmittance of the optical system become issues.

Inequality (4) defines a proper range for a ratio of the radius of curvature of the half-transmissive reflective surface disposed on the cemented surface and the focal length of the entire optical system. Each example disposes the half-transmissive reflective surface on the cemented surface, thereby avoiding the total reflection condition, allowing the half-transmissive reflective surface to share strong optical power, and increasing the magnification of the display optical system. In a case where |Rhm|/f becomes lower than the lower limit of equation (4), the radius of curvature of the half-transmissive reflective surface becomes too smaller for the focal length of the entire optical system, and it becomes difficult to compensate for the curvature of field occurring in the optical system using the curved display surface. In a case where |Rhm|/f becomes higher than the upper limit of inequality (4), the radius of curvature of the half-transmissive reflective surface becomes too large for the focal length of the entire optical system. Then, the optical power shared by the reflective surface (concave mirror) in the half-transmissive reflective surface decreases, and it becomes difficult to increase the magnification of the optical system.

Inequality (5) defines a proper range for a ratio of the radius of curvature of the half-transmissive reflective surface disposed on the cemented surface to the radius of curvature of the display surface. Properly setting both the radius of curvature of the half-transmissive reflective surface and the radius of curvature of the display surface can correct curvature of field of the entire display apparatus and enable the curvature of the display element to be manufactured as a device. In a case where |Rhm|/|Rp| becomes lower than the lower limit of inequality (5), the radius of curvature of the half-transmissive reflective surface becomes too small for the radius of curvature of the display surface, and the curvature of field of the entire display apparatus cannot be insufficiently corrected. In a case where |Rhm|/|Rp| becomes higher than the upper limit of inequality (5), the radius of curvature of the half-transmissive reflective surface becomes too large for the radius of curvature of the display element surface. In this case, it becomes difficult to increase the magnification of the optical system, the curvature of field of the entire display apparatus can be overcorrected, and additionally it becomes difficult to manufacture the display element.

Inequalities (1) to (5) may be replaced with inequalities (1a) to (5a) below:

$$-3.0 \leq fG1/fG2 \leq -0.2 \quad (1a)$$

$$1.45 \leq Ndp < Ndn \leq 1.8 \quad (2a)$$

$$1.4 \leq vdp/vdn \leq 3.5 \quad (3a)$$

$$1.0 < |Rhm|/f \leq 4.0 \quad (4a)$$

$$0.2 \leq |Rhm|/|Rp| \leq 1.7 \quad (5a)$$

Inequalities (1) to (5) may be replaced with inequalities (1b) to (5b) below:

$$-1.5 \leq fG1/fG2 \leq -0.4 \quad (1b)$$

$$1.5 \leq Ndp < Ndn \leq 1.7 \quad (2b)$$

$$1.8 \leq vdp/vdn \leq 3.0 \quad (3b)$$

$$1.0 < |Rhm|/f \leq 3.6 \quad (4b)$$

$$0.3 \leq |Rhm|/|Rp| \leq 1.4 \quad (5b)$$

The display optical systems according to Examples 1, 2, and 4 have an aspherical refractive surface (lens surface) that has an inflection point within the optical effective diameter. The inflection point is a point (line) at which the refractive power on the refractive surface changes from positive to negative. In Examples 1, 2, and 4, the configuration compensates for the curvature of field of the display optical system using a display element with a curved display surface, but astigmatism is to be corrected within the display optical system. An aspherical refractive surface with an inflection point can significantly change the divergence and convergence of the refractive surface near and off the optical axis, and is effective for correcting astigmatism while allowing curvature of field in the display optical system.

In Examples 1 to 4, the half-transmissive reflective surface with a smaller curvature of the two half-transmissive reflective surfaces is configured as a flat surface. The configuration using polarization illustrated in FIG. 13 cements a polarizing element with a plane, and reduce the thickness of the display optical system. In addition, the flat cemented surface with the polarizing element can facilitate the cementing process with the polarizing element. Moreover, the two half-transmissive reflective surfaces that are both curved surfaces as in Example 5 enable the two reflective surfaces with optical powers to be placed within the display optical system, and increase the degree of design freedom. This is beneficial to increasing a higher magnification of the display optical system.

In Examples 1 to 3 and 5, the optical element having optical power included in the display optical system consists of the cemented lens. Thereby, the required optical performance can be achieved with a minimum configuration, and the weight of the display optical system can be reduced.

In each example, the absolute value of the angle between the pupil center ray (ray passing through the center of the pupil plane) and the normal to the display surface is 30 degrees or less with an eye relief of 15 mm, at a diopter of 0 diopter, and at an angle of field of 30 degrees. In a case where the display surface has a rotationally asymmetric shape with respect to the optical axis, this angle is evaluated based on a direction in which a radius of curvature (absolute value) of the spherical surface defined by a surface vertex on the optical axis of the display surface and an effective area of the display surface has a minimum value.

The conventional display optical system having a triple-pass configuration using two half-transmissive reflective surfaces has problems of increased curvature of field and an increased ray incident angle on the display surface in an attempt at a high magnification.

Using the display element with the curved display surface can reduce the ray incident angle relative to the normal line of the display surface, and improve luminance shading and color shift at the periphery of an image (screen). The angle (absolute value) between the pupil center ray and the normal to the display element surface may be 20 degrees or less as in each example. As in Examples 1, 3 to 5, the angle (absolute value) between the pupil center ray and the normal to the display element surface may be 10 degrees or less.

In each example, at least one of the two half-transmissive reflective surfaces includes a polarization selective half-transmissive reflective element. Thereby, the configuration using polarization illustrated in FIG. 13 can be easily realized. That is, using polarization can shield unnecessary light that would transmit from the display surface without being reflected by the two half-transmissive reflective surfaces and reach the pupil plane. Examples of polarization-selective half-transmissive reflective elements include wire grid elements such as WGF (registered trademark) manufactured by Asahi Kasei, reflection type linear polarizing elements such as IQP-E manufactured by 3M, and circularly polarized reflective elements using cholesteric liquid crystal. In using the reflection type linear polarizing elements, a quarter waveplate is placed between the two half-transmissive reflective surfaces.

A description will now be given of Examples 1 to 5 and corresponding numerical examples 1 to 5. Numerical examples 1 to 5 will be illustrated together after Example 5. Numerical values in the numerical examples will be described later.

Example 1

A display apparatus according to Example 1 (numerical example 1) illustrated in FIGS. 1 and 2 has a horizontal angle of field of about 90 degrees. The display optical system according to this example includes a cemented lens consisting of a plano-convex lens G1 disposed on the observation side and an aspherical lens G2 disposed on the display element side, a second half-transmissive reflective surface HM having an aspheric surface and a concave surface toward the observation side. A first half-transmissive reflective surface PBS is disposed on the surface (plane) on the observation side of the lens G1. Due to this configuration, the lens G1 can be used as the triple pass, and a high magnification and a reduced thickness of the display optical system can be realized. Using a resin material as the material for the lenses G1 and G2 can reduce the weight of the display optical system. Moreover, cementing the lens G1 as a positive lens made of a low dispersion material and the lens G2 as a negative lens made of a high dispersion material can satisfactorily correct chromatic aberration of the display optical system. Furthermore, the aspheric surface on the display element side of the lens G2 having an inflection point within the optical effective diameter can satisfactorily correct astigmatism.

The display element has a display surface ID having a rectangular shape with an effective area having an aspect ratio of approximately 16:9, and the display surface ID in the ZX section (horizontal angle-of-field direction parallel to the longitudinal direction of the display surface) illustrated in FIG. 1 has a cylindrical shape with a convex surface toward the observation side. Thereby, curvature of field remaining in the display optical system can be compensated for by the curved display surface ID, and a display apparatus having excellent image plane characteristics in the horizontal angle-of-field direction can be realized.

The display optical system according to numerical example 1 satisfies all of inequalities (1) to (5).

Figure 3:
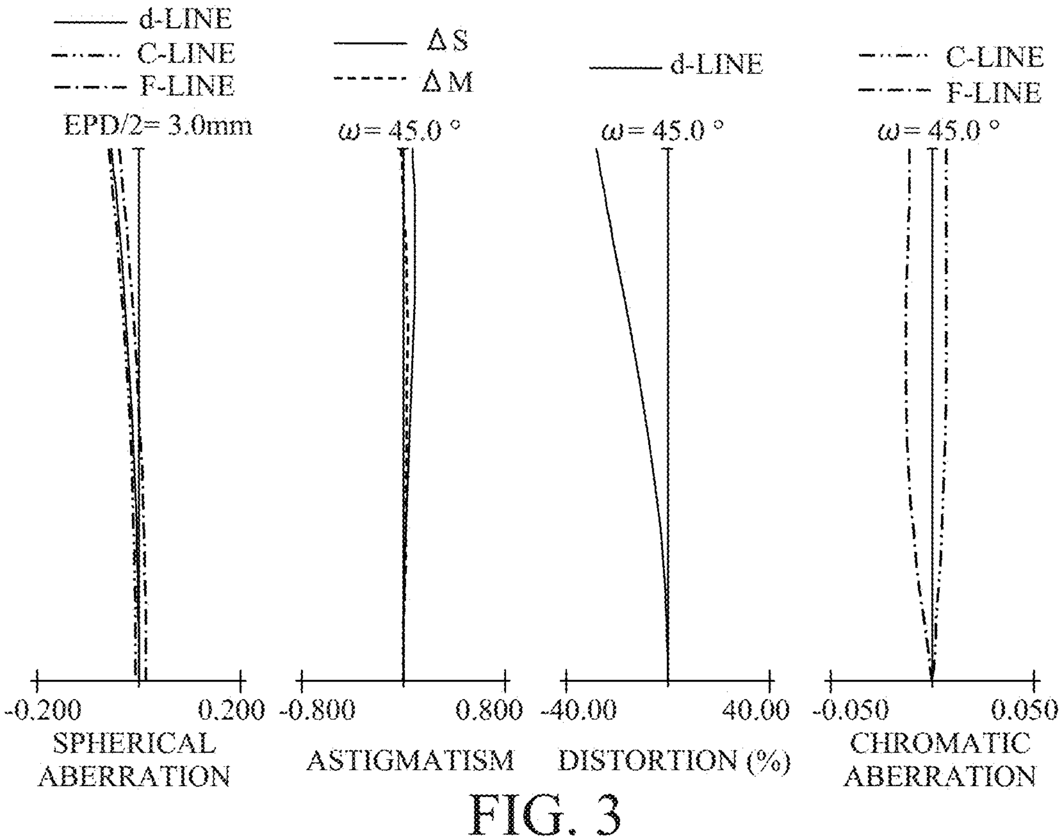
FIG. 3 is a longitudinal aberration diagram in a horizontal angle-of-field direction of the display optical system according to Example 1.
Figure 4:
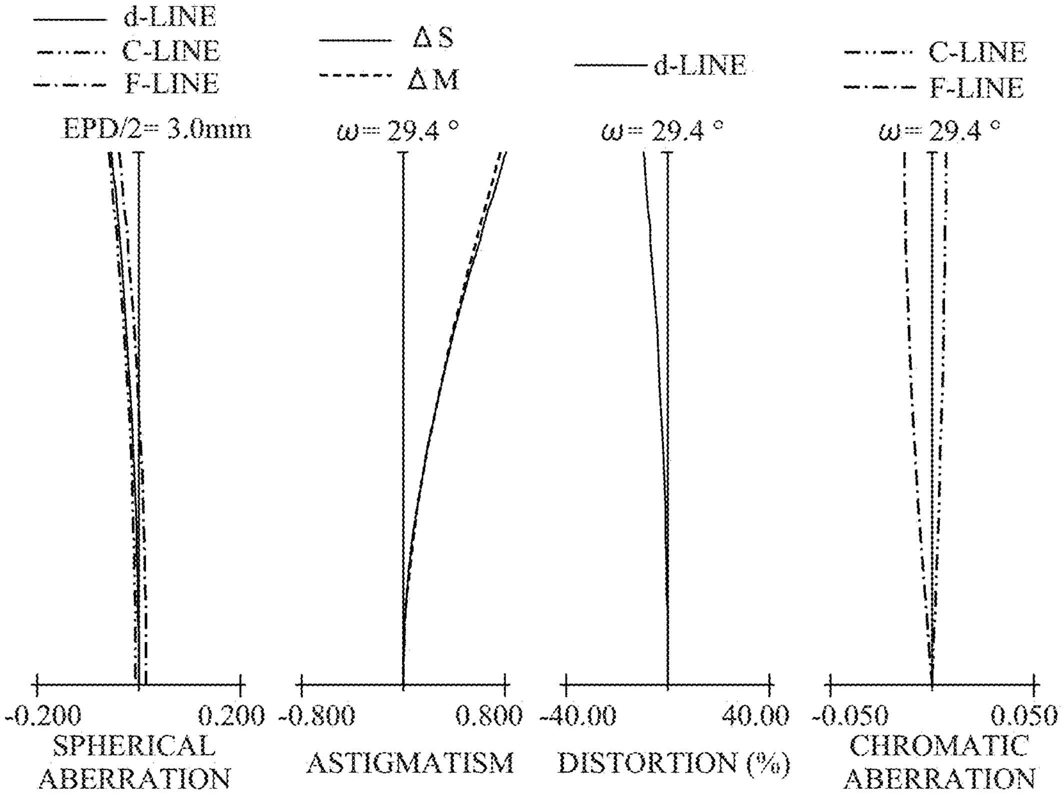
FIG. 4 is a longitudinal aberration diagram of the display optical system according to Example 1 in a vertical angle-of-field direction.

FIGS. 3 and 4 respectively illustrate longitudinal aberrations (spherical aberration, astigmatism, distortion, and chromatic aberration) in the horizontal angle-of-field direction and the vertical angle-of-field direction of the display optical system according to numerical example 1. In the spherical aberration diagram, EPD/2 represents a radius of the pupil plane SP, a solid line represents a spherical aberration amount for the d-line (wavelength 587.6 nm), and an alternate long and two short dashes line represents a spherical aberration amount for the C-line (wavelength 656.3 nm). An alternate long and short dash line represents a spherical aberration amount for the F-line (wavelength 486.1 nm). In the astigmatism diagram, a solid line ΔS represents an astigmatism amount on a sagittal image plane, and a broken line ΔM represents an astigmatism amount on a meridional image plane. A distortion aberration illustrates a distortion amount for the d-line. A chromatic aberration diagram illustrates lateral chromatic aberration amounts for the C-line and F-line. @ represents a half angle of view (°).

Example 2

Figure 5:
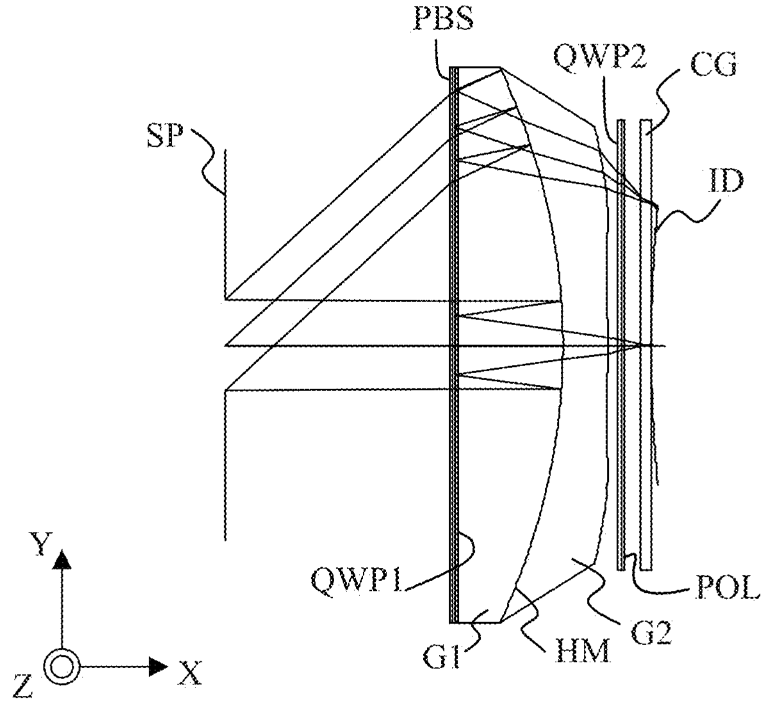
FIG. 5 is a YX sectional view of a display optical system according to Example 2.

A display apparatus according to Example 2 (numerical example 2) illustrated in FIG. 5 has horizontal and vertical angle of fields of about 85 degrees. The basic configuration of the display apparatus according to this example is the same as that of Example 1, but the specifications of the display element and display optical system are different from those of Example 1.

The display element has a display surface ID having a square shape with an effective area having an aspect ratio of about 1:1, and the display surface ID in the YX section illustrated in FIG. 5 and the unillustrated ZX section has a spherical surface with a convex surface toward the observation side. Thereby, curvature of field remaining in the display optical system can be compensated for by the curved display surface ID, and a display apparatus having excellent image plane characteristics in the horizontal angle-of-field direction can be realized.

Figure 6:
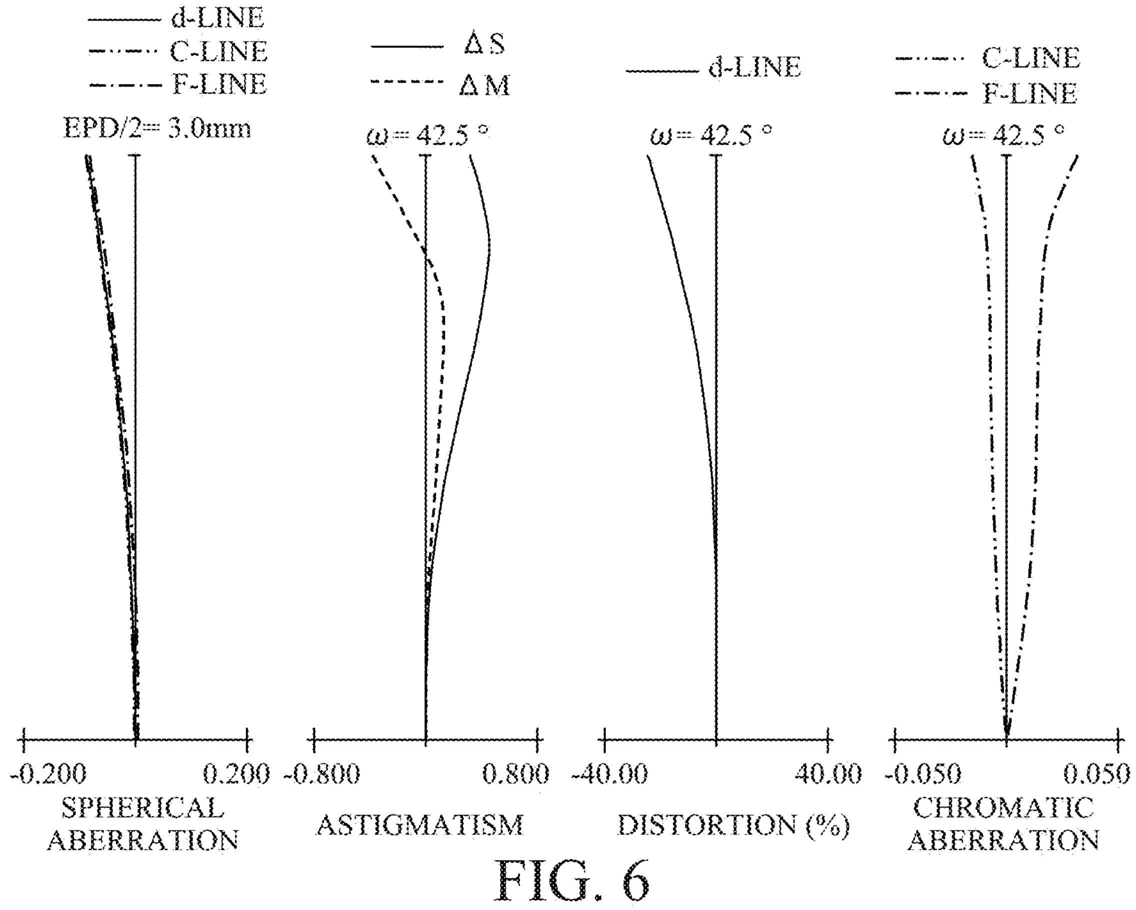
FIG. 6 is a longitudinal aberration diagram of the display optical system according to Example 2 in horizontal and vertical angle-of-field directions.

The display optical system according to numerical example 2 satisfies all of inequalities (1) to (5). FIG. 6 illustrates longitudinal aberrations in the horizontal and vertical angle-of-field directions of the display optical system according to numerical example 2.

Example 3

Figure 7:
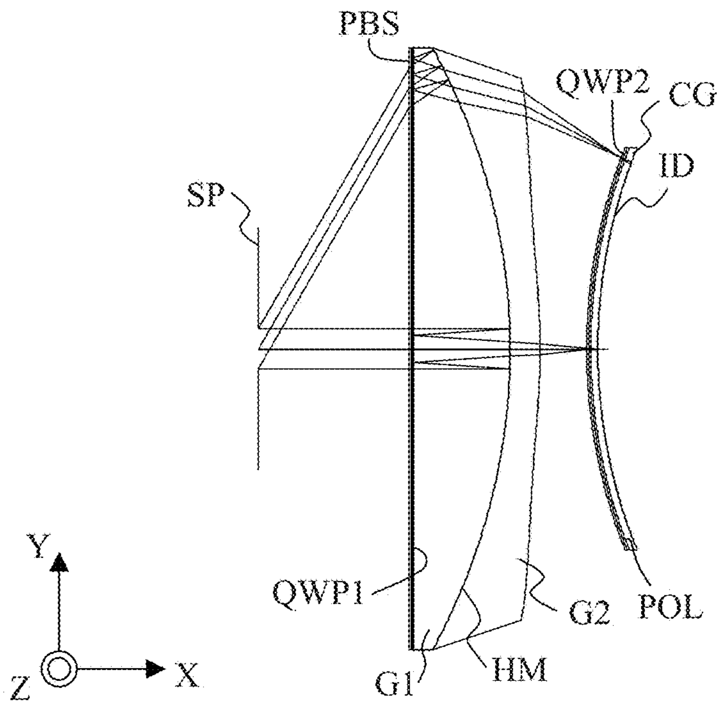
FIG. 7 is a YX sectional view of a display optical system according to Example 3.

A display apparatus according to Example 3 (numerical example 3) illustrated in FIG. 7 has horizontal and vertical angle of fields of about 120 degrees. The basic configuration of the display apparatus according to this example is the same as that of Example 2, but the specifications of the display element and display optical system are different from those of Example 2.

The display element has a display surface ID having a square shape with an effective area having an aspect ratio of approximately 1:1, and the display surface ID in the YX section illustrated in FIG. 7 and the unillustrated ZX section has a spherical surface with a convex surface toward the observation side. Thereby, curvature of field remaining in the display optical system can be compensated for by the curved display surface ID, and a display apparatus having excellent image plane characteristics in the horizontal angle-of-field direction can be realized.

Figure 8:
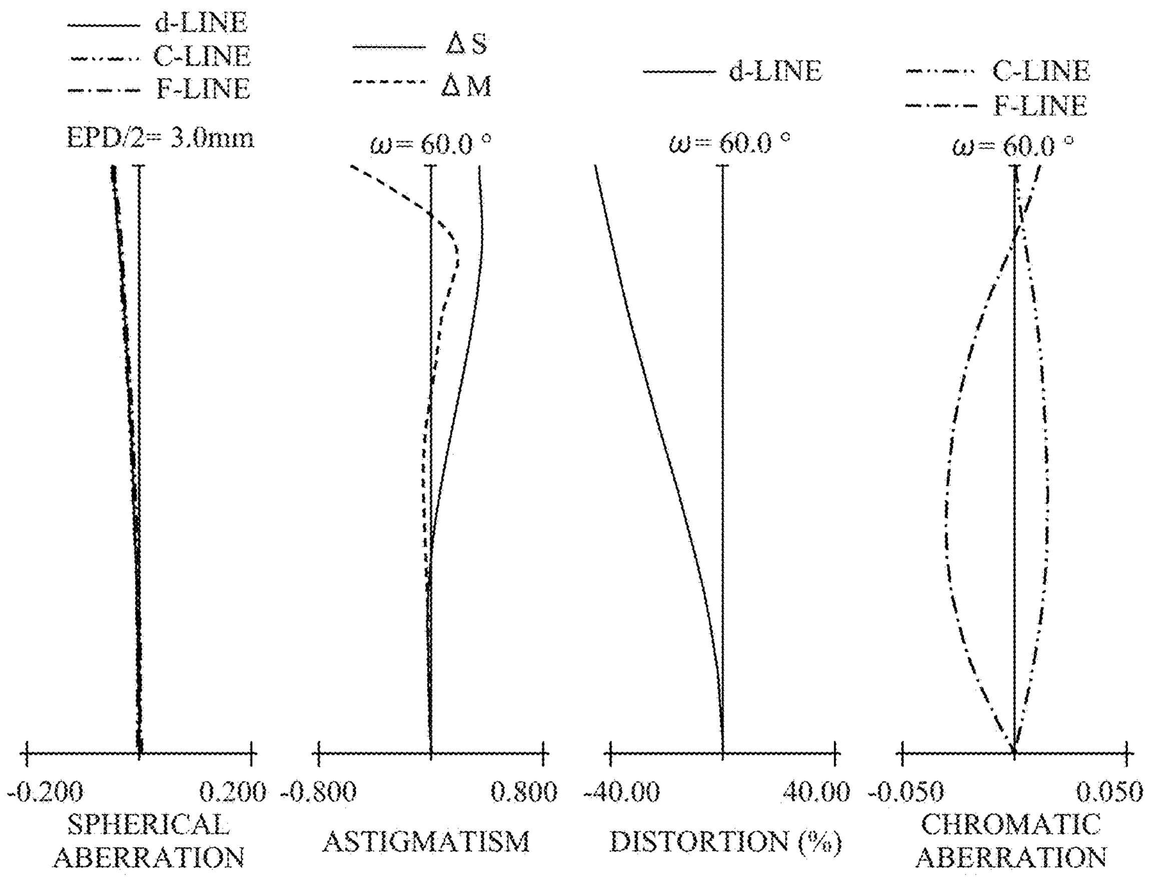
FIG. 8 is a longitudinal aberration diagram of the display optical system according to Example 3 in horizontal and vertical angle-of-field directions.

The display optical system according to numerical example 3 satisfies all of inequalities (1) to (5). FIG. 8 illustrates longitudinal aberrations in the horizontal and vertical angle-of-field directions of the display optical system according to numerical example 3.

Example 4

Figure 9:
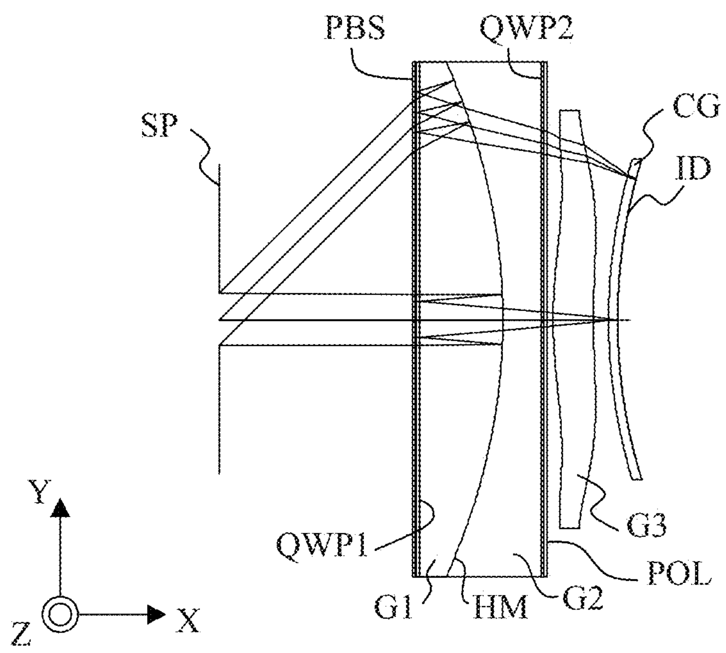
FIG. 9 is a YX sectional view of a display optical system according to Example 4.

A display apparatus according to Example 4 (numerical example 4) illustrated in FIG. 9 has horizontal and vertical angle of fields of about 90 degrees. The basic configuration of the display apparatus of this example is the same as that of Example 1, but the specifications of the display element and display optical system are different from those of Example 1.

In the display optical system according to this embodiment, incident and exit surfaces of a cemented lens having a second half-transmissive reflective surface HM disposed on its cemented surface are made of flat surfaces, and an aspherical lens G3 made of a resin material and disposed on the display element side of the cemented lens burdens aberration correction.

This example disposes the first half-transmissive reflective surface PBS on the surface (plane) on the observation side of the lens G1, uses the lens G1 for the triple pass, and thereby realizes a high magnification and a reduced thickness of the display optical system. The aspheric surface on the display element side of the lens G3 has an inflection point within the optically effective diameter and can satisfactorily correct astigmatism.

The display element has a display surface ID having a square shape with an effective area having an aspect ratio of approximately 1:1, and the display surface ID in the YX section illustrated in FIG. 9 and the unillustrated ZX section has a spherical shape with a convex surface toward the observation side. Thereby, curvature of field remaining in the display optical system can be compensated for by the curved display surface ID, and a display apparatus having excellent image plane characteristics in the horizontal angle-of-field direction can be realized.

Figure 10:
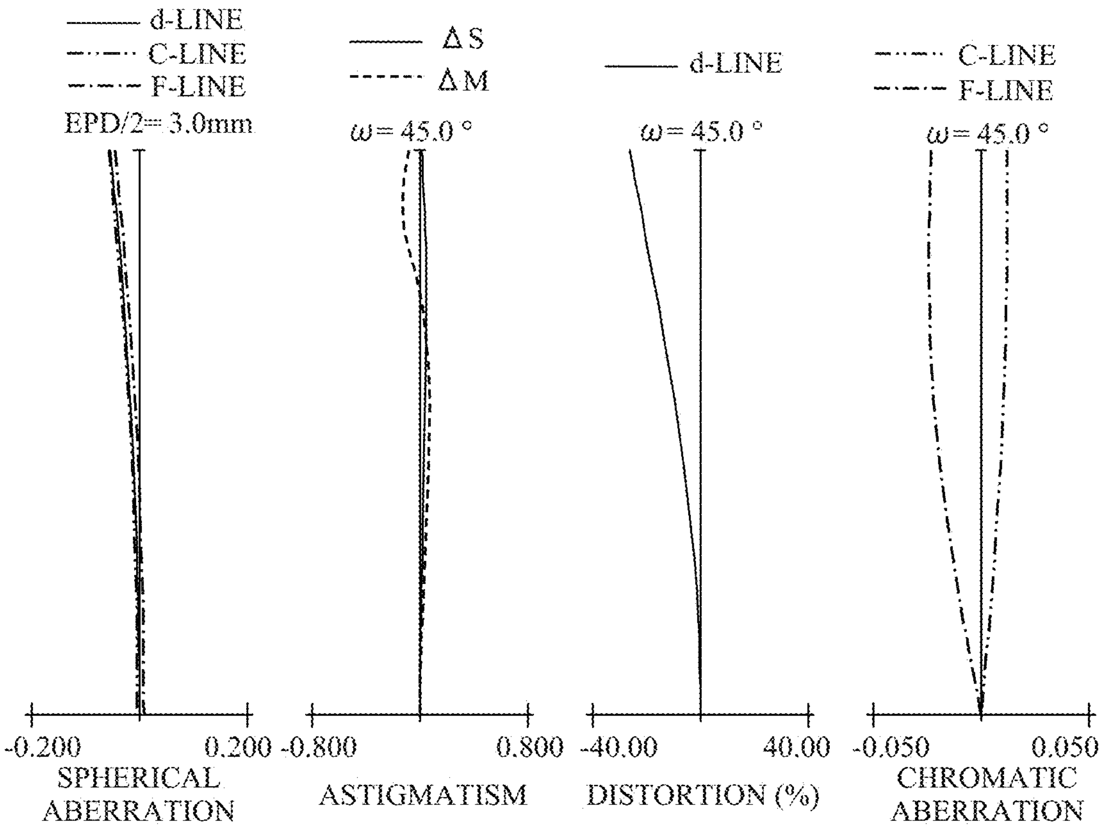
FIG. 10 is a longitudinal aberration diagram of the display optical system according to Example 4 in horizontal and vertical angle-of-field directions.

A display optical system according to numerical example 4 satisfies all of inequalities (1) to (5). FIG. 10 illustrates longitudinal aberrations in the horizontal and vertical angle-of-field directions of the display optical system according to numerical example 4.

Example 5

Figure 11:
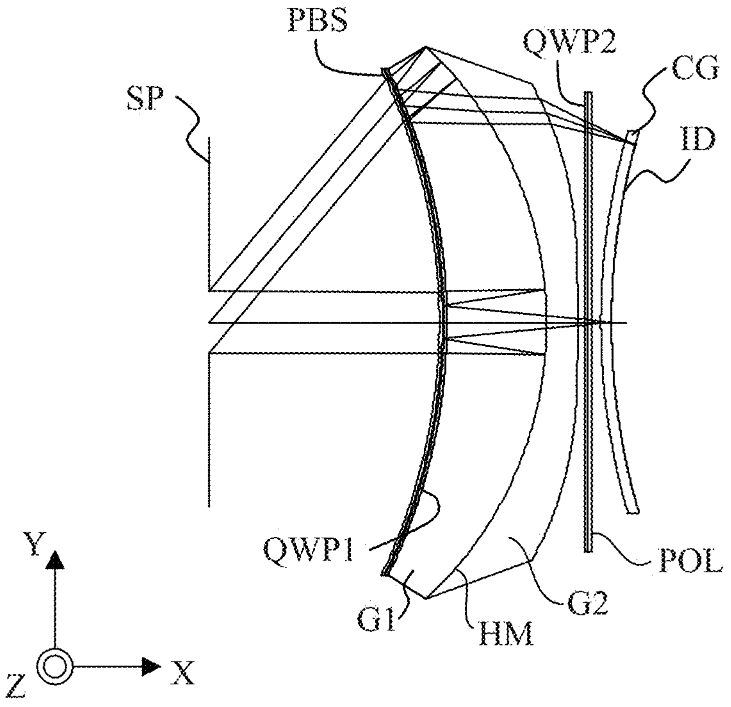
FIG. 11 is a YX sectional view of a display optical system according to Example 5.

A display apparatus according to Example 5 (numerical example 5) illustrated in FIG. 11 has horizontal and vertical angle of fields of about 100 degrees. The basic configuration of the display apparatus according to this example is the same as that of Example 1, but this example is different from Example 1 in that the two half-transmissive reflective surfaces PBS and HM are curved surfaces. The first half-transmissive reflective surface PBS disposed on the surface on the observation side of the lens G1 as a curved surface can realize a higher magnification of the display optical system.

The display element has a display surface ID having a square shape with an effective area having an aspect ratio of approximately 1:1, and the display surface ID in the YX section illustrated in FIG. 11 and the unillustrated ZX section has a spherical shape with a convex surface toward the observation side. Thereby, the curvature of field remaining in the display optical system can be compensated for by the curved display surface ID, and a display apparatus having excellent image surface characteristics in the horizontal angle-of-field direction can be realized.

Figure 12:
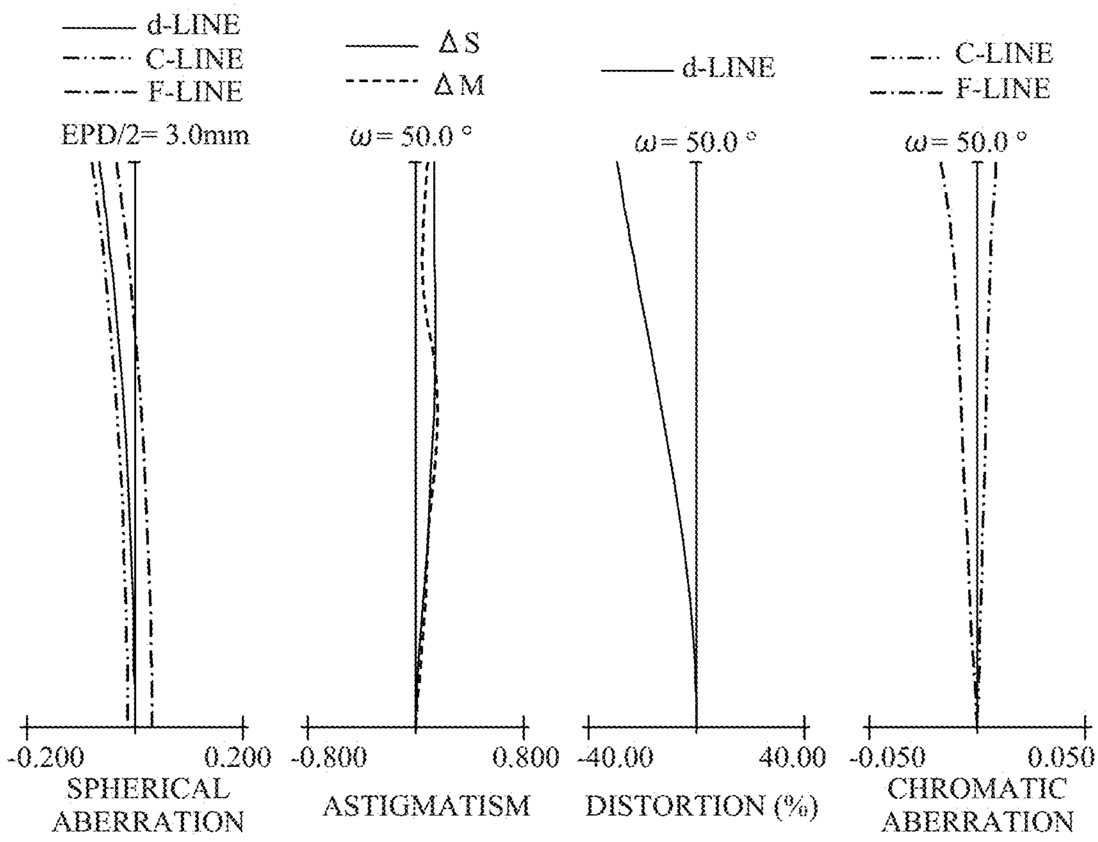
FIG. 12 is a longitudinal aberration diagram of the display optical system according to Example 5 in horizontal and vertical angle-of-field directions.

The display optical system according to numerical example 5 satisfies all of inequalities (1) to (5). FIG. 12 illustrates longitudinal aberrations in the horizontal and vertical angle-of-field directions of the display optical system according to numerical example 5.

The aspect ratio and shape of the effective area of the display element (display surface) according to each example can be arbitrarily set. For example, the shape of the effective area of the display element may be circular, polygonal, or the like, in addition to the rectangle (or square). Furthermore, the curved surface shape of the display element may be set to an anamorphic surface shape, an aspherical surface shape, a free-form surface shape, etc. in addition to the cylindrical shape or spherical shape.

Numerical examples 1 to 5 will be illustrated below. In each numerical example, a surface number i represents the order of surfaces counted from the object side. r represents a radius of curvature of an i-th surface from the object side (mm), d represents a lens thickness or air distance (mm) between i-th and (i+1)-th surfaces, and nd is a refractive index for the d-line of the optical material between the i-th and (i+1)-th surfaces. νd is an Abbe number based on the d-line of the optical material between the i-th and (i+1)-th surfaces.

The Abbe number νd is expressed as νd=(Nd−1)/(NF−NC) where Nd, NF, and NC are refractive indices for the d-line (587.6 nm), the F-line (486.1 nm), and the C-line (656.3 nm) in the Fraunhofer line. An effective diameter is a diameter (mm) of an area on the i-th surface which rays that contribute to imaging (image display) enter, out of light from the display surface. Each numerical example illustrates a focal length, a pupil diameter, and an overall angle of field of the display optical system.

An asterisk "*" attached to a surface number means that that surface has an aspherical shape. The shape of the aspherical surface shape is expressed as follows, where x is a displacement amount from the surface vertex in the optical axis direction, h is a height from the optical axis in the direction orthogonal to the optical axis, R is a paraxial radius of curvature, k is a conical constant, and A4, A6, A8, A10, and A12 are aspherical coefficients. "e-x" in the conic constant and aspherical coefficient means$\times 10^{-x}$.

$$x=(h^2/R)/\left[1+\{1-(1+k)(h/R)^2\}^{1/2}\right]+A4\cdot h4+A6\cdot h6+A8\cdot h8+A10\cdot h10+A12\cdot h12$$

Table 1 summarizes values corresponding to inequalities (1) to (5) in numerical examples 1 to 5. Tables 2 and 4 illustrate various numerical values for numerical examples 1 to 5 (exit angle and incident angle in table 4 are those for reverse ray tracing), and Table 3 illustrates inflection points in numerical examples 1, 2, and 4.

Numerical Example 1

UNIT: mm

SURFACE DATA

| Surface No. | r | d | nd | νd | Effective Diameter (Z, Y) |
|---|---|---|---|---|---|
| 1 (Pupil Plane) | ∞ | (Variable) | | | 6.00 |
| 2 | ∞ | 0.20 | 1.49000 | 50.0 | (39.00, 27.00) |
| 3 | ∞ | 0.10 | 1.51000 | 50.0 | (39.00, 27.00) |
| 4 | ∞ | 0.20 | 1.58000 | 50.0 | (39.00, 27.00) |
| 5 | ∞ | 7.00 | 1.54500 | 56.2 | (39.00, 27.00) |
| 6* | −44.529 | −7.00 | | | (39.00, 27.00) |

-continued

| UNIT: mm | | | | | |
|---|---|---|---|---|---|
| 7 | ∞ | −0.20 | 1.58000 | 50.0 | (39.00, 27.00) |
| 8 | ∞ | 0.20 | | | (39.00, 27.00) |
| 9 | ∞ | 7.00 | 1.54500 | 56.2 | (39.00, 27.00) |
| 10* | −44.529 | 3.50 | 1.64000 | 22.5 | (39.00, 27.00) |
| 11* | −332.092 | 1.08 | | | (32.00, 27.00) |
| 12 | ∞ | 0.20 | 1.58000 | 50.0 | 30.00 |
| 13 | ∞ | 0.20 | 1.49000 | 50.0 | 30.00 |
| 14 | ∞ | 1.20 | | | 30.00 |
| 15 | ∞ | 0.70 | 1.51633 | 64.1 | 30.00 |
| 16 | ∞ | 0.00 | | | 30.00 |
| Display Surface (Z, Y) = (37.000, ∞) | | | | | |

ASPHERIC DATA

6th Surface

K = 0.00000e+00 A 4 = 1.07930e−07 A 6 = −1.20647e−09 A 8 = 9.57432e−12
A10 = −2.62069e−14 A12 = 3.48383e−17

10th Surface

K = 0.00000e+00 A 4 = 1.07930e−07 A 6 = −1.20647e−09 A 8 = 9.57432e−12
A10 = −2.62069e−14 A12 = 3.48383e−17

11th Surface

K = 0.00000e+00 A 4 = 5.45637e−05 A 6 = −6.07318e−07 A 8 = 2.74780e−09
A10 = −6.65150e−12 A12 = 6.85403e−15

VARIOUS DATA

| | |
|---|---|
| Focal Length | 14.48 |
| Pupil Diameter | 6.00 |
| Overall angle of field (°) | (Z, Y) = (90.00, 58.72) |
| d1 | 15.00 |
| Entrance Pupil Position | 0.00 |
| Exit Pupil Position | 38.81 |
| Front Principal Point Position | 19.89 |
| Rear Principal Point Position | −14.48 |

LENS UNIT DATA

| Lens Unit | Starting Surface | Focal Length | Lens Construction Length | Front Principal Point Position | Rear Principal Point Position |
|---|---|---|---|---|---|
| 1 | 2 | 14.48 | 14.38 | 4.89 | −14.48 |

SINGLE LENS DATA

| LENS | Starting Surface | Focal Length |
|---|---|---|
| Pupil Plane | 1 | 0.00 |
| POL | 2 | 0.00 |
| PBS | 3 | 0.00 |
| QWP1 | 4 | 0.00 |
| G1 | 5 | 81.71 |
| G2 (HM) | 10 | −80.73 |
| QWP2 | 12 | 0.00 |
| POL | 13 | 0.00 |
| CG | 15 | 0.00 |

Numerical Example 2

UNIT: mm

SURFACE DATA

| Surface No. | r | d | nd | νd | Effective Diameter |
|---|---|---|---|---|---|
| 1 (Pupil Plane) | ∞ | (Variable) | | | 6.00 |
| 2 | ∞ | 0.20 | 1.49000 | 50.0 | 37.00 |
| 3 | ∞ | 0.10 | 1.51000 | 50.0 | 37.00 |
| 4 | ∞ | 0.20 | 1.58000 | 50.0 | 37.00 |
| 5 | ∞ | 7.00 | 1.57500 | 55.4 | 37.00 |
| 6* | −43.000 | −7.00 | | | 37.00 |

-continued

| UNIT: mm | | | | | |
|---|---|---|---|---|---|
| 7 | ∞ | −0.20 | 1.58000 | 50.0 | 37.00 |
| 8 | ∞ | 0.20 | | | 37.00 |
| 9 | ∞ | 7.00 | 1.57500 | 55.4 | 37.00 |
| 10* | −43.000 | 3.00 | 1.64000 | 23.5 | 37.00 |
| 11* | −42.050 | 0.68 | | | 29.00 |
| 12 | ∞ | 0.20 | 1.58000 | 50.0 | 30.00 |
| 13 | ∞ | 0.20 | 1.49000 | 50.0 | 30.00 |
| 14 | ∞ | 1.20 | | | 30.00 |
| 15 | ∞ | 0.70 | 1.51633 | 64.1 | 30.00 |
| 16 | ∞ | 0.00 | | | 30.00 |
| Display Surface 100.000 | | | | | |

ASPHERIC DATA

6th Surface

K = 0.00000e+00 A 4 = −1.32805e−06 A 6 3.76169e−09

10th Surface

K = 0.00000e+00 A 4 = −1.32805e−06 A 6 = 3.76169e−09

11th Surface

K = 0.00000e+00 A 4 = 4.12993e−04 A 6 = −4.91892e−06 A 8 = 2.28817e−08
A10 = −3.78901e−11

| VARIOUS DATA | |
|---|---|
| Focal Length | 13.20 |
| Pupil Diameter | 6.00 |
| Overall angle of field (°) | 85.00 |
| d1 | 15.00 |
| Entrance Pupil Position | 0.00 |
| Exit Pupil Position | 20.26 |
| Front Principal Point Position | 21.80 |
| Rear Principal Point Position | −13.20 |

LENS UNIT DATA

| Lens Unit | Starting Surface | Focal Length | Lens Construction Length | Front Principal Point Position | Rear Principal Point Position |
|---|---|---|---|---|---|
| 1 | 2 | 13.20 | 13.48 | 6.80 | −13.20 |

SINGLE LENS DATA

| LENS | Starting Surface | Focal Length |
|---|---|---|
| Pupil Plane | 1 | 0.00 |
| POL | 2 | 0.00 |
| PBS | 3 | 0.00 |
| QWP1 | 4 | 0.00 |
| G1 | 5 | 74.78 |
| G2 (HM) | 10 | 1332.20 |
| QWP2 | 12 | 0.00 |
| POL | 13 | 0.00 |
| CG | 15 | 0.00 |

Numerical Example 3

UNIT: mm

SURFACE DATA

| Surface No. | r | d | nd | νd | Effective Diameter |
|---|---|---|---|---|---|
| 1 (Pupil Plane) | ∞ | (Variable) | | | 6.00 |
| 2 | ∞ | 0.20 | 1.49000 | 50.0 | 60.00 |
| 3 | ∞ | 0.10 | 1.51000 | 50.0 | 60.00 |
| 4 | ∞ | 0.20 | 1.58000 | 50.0 | 60.00 |
| 5 | ∞ | 9.60 | 1.54400 | 56.2 | 60.00 |
| 6* | −61.371 | −9.60 | | | 60.00 |
| 7 | ∞ | −0.20 | 1.58000 | 50.0 | 60.00 |
| 8 | ∞ | 0.20 | | | 60.00 |

-continued

UNIT: mm

| | | | | | |
|---|---|---|---|---|---|
| 9 | ∞ | 9.60 | 1.54400 | 56.2 | 60.00 |
| 10* | −61.371 | 3.00 | 1.66000 | 21.0 | 60.00 |
| 11* | −63.802 | 4.46 | | | 54.00 |
| 12 | 54.400 | 0.20 | 1.58000 | 50.0 | 40.00 |
| 13 | 54.200 | 0.20 | 1.49000 | 50.0 | 40.00 |
| 14 | 54.000 | 0.70 | 1.51633 | 64.1 | 40.00 |
| 15 | 53.300 | 0.00 | | | 40.00 |
| Display Surface 53.300 | | | | | |

ASPHERIC DATA

6th Surface

K = 0.00000e+00 A 4 = 1.69732e−07 A 6 = −4.58512e−10 A 8 = 1.04438e−12
A10 = −1.18179e−15 A12 = 5.77673e−19

10th Surface

K = 0.00000e+00 A 4 = 1.69732e−07 A 6 = −4.58512e−10 A 8 = 1.04438e−12
A10 = −1.18179e−15 A12 = 5.77673e−19

11th Surface

K = 0.00000e+00 A 4 = 2.90606e−05 A 6 = −6.94977e−08 A 8 = 9.77055e−11
A10 = −7.27403e−14 A12 = 1.95997e−17

VARIOUS DATA

| | |
|---|---|
| Focal Length | 18.94 |
| Pupil Diameter | 6.00 |
| Overall angle of field (°) | 120.00 |
| d1 | 15.00 |
| Entrance Pupil Position | 0.00 |
| Exit Pupil Position | 74.07 |
| Front Principal Point Position | 23.78 |
| Rear Principal Point Position | −18.94 |

LENS UNIT DATA

| Lens Unit | Starting Surface | Focal Length | Lens Construction Length | Front Principal Point Position | Rear Principal Point Position |
|---|---|---|---|---|---|
| 1 | 2 | 18.94 | 18.66 | 8.78 | −18.94 |

SINGLE LENS DATA

| LENS | Starting Surface | Focal Length |
|---|---|---|
| Pupil Plane | 1 | 0.00 |
| POL | 2 | 0.00 |
| PBS | 3 | 0.00 |
| QWP1 | 4 | 0.00 |
| G1 | 5 | 112.81 |
| G2 (HM) | 10 | −4793.67 |
| QWP2 | 12 | −40160.33 |
| POL | 13 | −44499.31 |
| CG | 14 | −12075.06 |

Numerical Example 4

UNIT: mm

SURFACE DATA

| Surface No. | r | d | nd | νd | Effective Diameter |
|---|---|---|---|---|---|
| 1 (Pupil Plane) | ∞ | (Variable) | | | 30.00 |
| 2 | ∞ | 0.20 | 1.49000 | 50.0 | 40.00 |
| 3 | ∞ | 0.10 | 1.51000 | 50.0 | 40.00 |
| 4 | ∞ | 0.20 | 1.58000 | 50.0 | 40.00 |
| 5 | ∞ | 6.50 | 1.54000 | 56.0 | 40.00 |
| 6* | −47.217 | −6.50 | | | 40.00 |
| 7 | ∞ | −0.20 | 1.58000 | 50.0 | 40.00 |
| 8 | ∞ | 0.20 | | | 40.00 |
| 9 | ∞ | 6.50 | 1.54000 | 56.0 | 40.00 |

-continued

| UNIT: mm | | | | | |
|---|---|---|---|---|---|
| 10* | −47.217 | 3.00 | 1.60700 | 27.0 | 40.00 |
| 11 | | 0.20 | 1.58000 | 50.0 | 40.00 |
| 12 | ∞ | 0.20 | 1.49000 | 50.0 | 40.00 |
| 13 | ∞ | 0.50 | | | 40.00 |
| 14* | 33.118 | 3.14 | 1.53000 | 55.0 | 32.50 |
| 15* | 63.161 | 1.33 | | | 32.50 |
| 16 | 43.200 | 0.70 | 1.51633 | 64.1 | 25.00 |
| 17 | 42.500 | 0.00 | | | 25.00 |
| Display Surface 42.500 | | | | | |

ASPHERIC DATA

6th Surface

K = 0.00000e+00 A 4 = −1.38181e−07 A 6 = 7.61577e−10 A 8 = 1.97719e−12
A10 = −1.54347e−14 A12 = 2.91621e−17

10th Surface

K = 0.00000e+00 A 4 = −1.38181e−07 A 6 = 7.61577e−10 A 8 = 1.97719e−12
A10 = −1.54347e−14 A12 = 2.91621e−17

14th Surface

K = 0.00000e+00 A 4 = −1.07263e−04 A 6 = 2.05131e−07

15th Surface

K = 0.00000e+00 A 4 = −1.04715e−04 A 6 = 2.21415e−07

VARIOUS DATA

| | |
|---|---|
| Focal Length | 14.67 |
| Pupil Diameter | 6.00 |
| Overall angle of field (°) | 90.00 |
| d1 | 15.00 |
| Entrance Pupil Position | 0.00 |
| Exit Pupil Position | 38.05 |
| Front Principal Point Position | 20.32 |
| Rear Principal Point Position | −14.67 |

LENS UNIT DATA

| Lens Unit | Starting Surface | Focal Length | Lens Construction Length | Front Principal Point Position | Rear Principal Point Position |
|---|---|---|---|---|---|
| 1 | 2 | 14.67 | 16.07 | 5.32 | −14.67 |

SINGLE LENS DATA

| LENS | Starting Surface | Focal Length |
|---|---|---|
| Pupil Plane | 1 | 0.00 |
| POL | 2 | 0.00 |
| PBS | 3 | 0.00 |
| QWP1 | 4 | 0.00 |
| G1 | 5 | 87.44 |
| G2 (HM) | 10 | −77.79 |
| QWP2 | 11 | 0.00 |
| POL | 12 | 0.00 |
| G3 | 14 | 126.78 |
| CG | 16 | −7702.66 |

NUMERICAL EXAMPLE 5
UNIT: mm

SURFACE DATA

| Surface No. | r | d | nd | νd | Effective Diameter |
|---|---|---|---|---|---|
| 1 (Pupil Plane) | ∞ | (Variable) | | | 6.00 |
| 2 | −37.898 | 0.20 | 1.49000 | 50.0 | 33.00 |
| 3 | −37.698 | 0.10 | 1.51000 | 50.0 | 33.00 |
| 4 | −37.598 | 0.20 | 1.58000 | 50.0 | 33.00 |
| 5 | −37.398 | 6.50 | 1.54000 | 56.0 | 33.00 |
| 6* | −24.733 | −6.50 | | | 36.00 |
| 7 | −37.398 | −0.20 | 1.58000 | 50.0 | 33.00 |

-continued

| NUMERICAL EXAMPLE 5<br>UNIT: mm | | | | | |
|---|---|---|---|---|---|
| 8 | −37.598 | 0.20 | | | 33.00 |
| 9 | −37.398 | 6.50 | 1.54000 | 56.0 | 33.00 |
| 10* | −24.733 | 2.00 | 1.64000 | 22.0 | 36.00 |
| 11* | −1305.271 | 0.50 | | | 31.00 |
| 12 | ∞ | 0.20 | 1.58000 | 50.0 | 30.00 |
| 13 | ∞ | 0.20 | 1.49000 | 50.0 | 30.00 |
| 14 | ∞ | 0.76 | | | 30.00 |
| 15 | 44.660 | 0.70 | 1.51633 | 64.1 | 25.00 |
| 16 | 43.960 | 0.00 | | | 25.00 |
| Display Surface 43.960 | | | | | |

ASPHERIC DATA

6th Surface

K = 0.00000e+00 A 4 = 7.86898e−08 A 6 = −9.99204e−09 A 8 = 6.36425e−11
A10 = −2.20795e−13 A12 = 2.88649e−16

10th Surface

K = 0.00000e+00 A 4 = 7.86898e−08 A 6 = −9.99204e−09 A 8 = 6.36425e−11
A10 = −2.20795e−13 A12 = 2.88649e−16

11th Surface

K = 0.00000e+00 A 4 = −1.14287e−04 A 6 = 5.91339e−07 A 8 = −2.28815e−09
A10 = 5.16921e−12 A12 = −5.11210e−15

| VARIOUS DATA | |
|---|---|
| Focal Length | 13.74 |
| Pupil Diameter | 6.00 |
| Overall angle of field (°) | 100.00 |
| d1 | 15.00 |
| Entrance Pupil Position | 0.00 |
| Exit Pupil Position | 157.16 |
| Front Principal Point Position | 14.94 |
| Rear Principal Point Position | −13.74 |

LENS UNIT DATA

| Lens Unit | Starting Surface | Focal Length | Lens Construction Length | Front Principal Point Position | Rear Principal Point Position |
|---|---|---|---|---|---|
| 1 | 2 | 13.74 | 11.36 | −0.06 | −13.74 |

SINGLE LENS DATA

| LENS | Starting Surface | Focal Length |
|---|---|---|
| Pupil Plane | 1 | 0.00 |
| POL | 2 | 10970.68 |
| PBS | 3 | 20775.06 |
| QWP1 | 4 | 8866.70 |
| G1 | 5 | 114.62 |
| G2 (HM) | 10 | −39.42 |
| QWP2 | 12 | 0.00 |
| POL | 13 | 0.00 |
| CG | 15 | −8236.54 |

TABLE 1

| | | | Numerical Example | | | | |
|---|---|---|---|---|---|---|---|
| Inequality | Lower Limit | Upper Limit | 1 | 2 | 3 | 4 | 5 |
| (1) | — | 0.0 | −0.928 | −0.697 | −0.812 | −1.124 | −1.167 |
| (2) Ndp | 1.4 | 1.9 | 1.545 | 1.575 | 1.544 | 1.540 | 1.540 |
| (2) Ndn | 1.4 | 1.9 | 1.640 | 1.640 | 1.660 | 1.607 | 1.640 |
| (3) | 1.0 | 4.0 | 2.501 | 2.357 | 2.678 | 2.074 | 2.545 |
| (4) | 1.0 | 5.0 | 3.103 | 3.254 | 3.254 | 3.075 | 1.778 |
| (5) | 0.1 | 2.0 | 1.215 | 0.430 | 1.164 | 1.120 | 0.558 |

TABLE 2

| Reference Radius of Curvature | Numerical Example 1 | Numerical Example 2 | Numerical Example 3 | Numerical Example 4 | Numerical Example 5 |
|---|---|---|---|---|---|
| Side Surface of Pupil Plane of G1 | ∞ | ∞ | ∞ | ∞ | −37.3982 |
| HM | −44.9470 | −42.9559 | −62.0474 | −47.5925 | −24.5503 |
| Side Surface of Display Surface of G2 | −220.4785 | −118.0496 | −191.2588 | ∞ | −42.1001 |

| Focal Length calculated from Reference Radius of Curvature | Example 1 | Example 2 | Example 3 | Example 4 | Example 5 |
|---|---|---|---|---|---|
| fG1 | 82.4716 | 74.7059 | 114.0577 | 88.1343 | 112.3977 |
| fG2 | −88.9047 | −107.1835 | −140.4520 | −78.4061 | −96.3041 |

TABLE 3

| | Example | | | | |
|---|---|---|---|---|---|
| | 1 | 2 | 3 | 4 | 5 |
| Lens Surface having Inflection Point within Optical Effective Diameter | Side Surface of Display Surface of G2 | Side Surface of Display Surface of G2 | — | Side Surface of Display Surface of G3 | — |

TABLE 4

| ER = 15<br>Evaluation Section | Numerical Example 1<br>ZX | |
|---|---|---|
| Exit angle (Angle of Field) of Pupil Center Ray from Pupil Plane | 30.0 | 45.0 |
| Incident Angle of Pupil Center Ray on Display Surface | −12.751 | −28.818 |
| Angle between Pupil Center Ray and Normal to Display Surface in Display Surface Coordinate System | −11.503 | −16.291 |
| Angle Between Pupil Center Ray and Normal to Display Surface | 1.248 | 12.527 |

| ER = 15 | Numerical Example 2 | | Numerical Example 3 | |
|---|---|---|---|---|
| Evaluation Section | XY | | | |
| Exit angle (Angle of Field) of Pupil Center Ray from Pupil Plane | 30.0 | 42.5 | 30.0 | 60.0 |
| Incident Angle of Pupil Center Ray on Display Surface | −15.221 | −36.033 | −6.388 | −30.399 |
| Angle between Pupil Center Ray and Normal to Display Surface in Display Surface Coordinate System | −3.999 | −5.257 | −10.643 | −19.433 |
| Angle Between Pupil Center Ray and Normal to Display Surface | 11.222 | 30.776 | 4.255 | 10.966 |

| ER = 15 | Numerical Example 4 | | Numerical Example 5 | |
|---|---|---|---|---|
| Evaluation Section | XY | | | |
| Exit angle (Angle of Field) of Pupil Center Ray from Pupil Plane | 30.0 | 45.0 | 30.0 | 50.0 |
| Incident Angle of Pupil Center Ray on Display Surface | −13.544 | −27.210 | −7.565 | −20.438 |
| Angle between Pupil Center Ray and Normal to Display Surface in Display Surface Coordinate System | −10.288 | −14.735 | −9.313 | −15.208 |
| Angle Between Pupil Center Ray and Normal to Display Surface | 3.256 | 12.475 | 1.748 | 5.230 |

Figure 14:
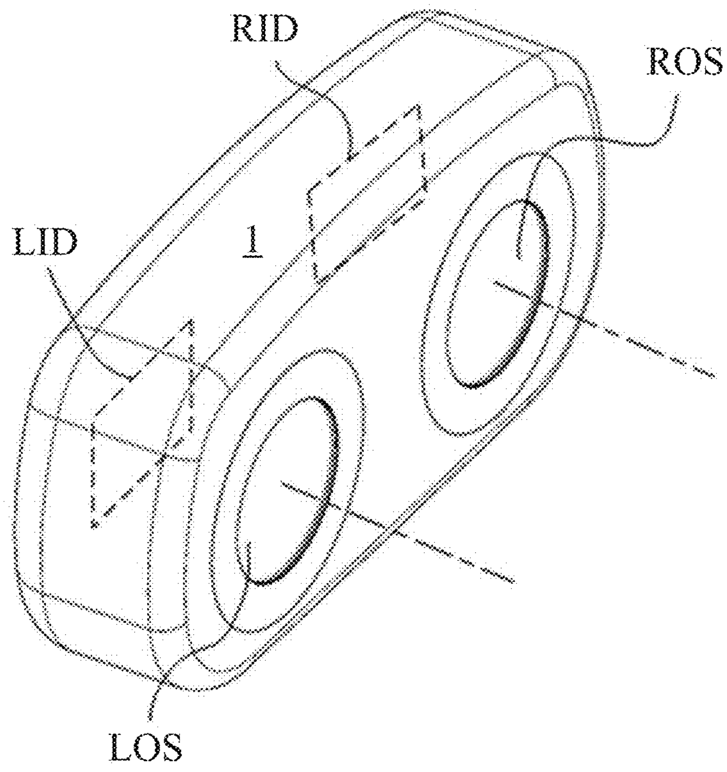
FIG. 14 illustrates an HMD using a display optical system according to any one of Examples 1 to 5.

FIG. 14 illustrates a head mount display (HMD) as a display apparatus according to any one of Examples 1 to 5. The HMD is mounted on the observer's head (in front of his eyes) by an unillustrated mount gear.

The HMD includes right-eye and left-eye display elements RID and LID, right-eye display optical system ROS configured to guide display light from the right-eye display element RID to the right eye of the observer, and left-eye display optical system LOS configured to guide display light from the left-eye image display element LID to the left eye of the observer.

The configurations described in Examples 1 to 5 can realize an HMD that has a reduced size and weight, and enables a high-quality image to be observed.

While the disclosure has described example embodiments, it is to be understood that some embodiments are not limited to the disclosed embodiments. The scope of the following claims is to be accorded the broadest interpretation so as to encompass all such modifications and equivalent structures and functions.

The display optical system with a triple-pass configuration according to each example can satisfactorily correct chromatic aberration, curvature of field, and astigmatism while providing a reflective surface with a strong light condensing effect for a high magnification and a reduced thickness.

This application claims priority to Japanese Patent Application No. 2023-123561, which was filed on Jul. 28, 2023, and which is hereby incorporated by reference herein in its entirety.

What is claimed is:

1. A display apparatus comprising:

a display element;

a display optical system configured to guide light from a display surface of the display element to an observation side; and two optical elements, wherein the display optical system includes a first half-transmissive reflective surface and a second half-transmissive reflective surface disposed on a cemented surface of the two optical elements, wherein the light from the display surface transmits through the second half-transmissive reflective surface, is reflected on the first half-transmissive reflective surface, is reflected on the second half-transmissive reflective surface, transmits through the first half-transmissive reflective surface, and is guided to the observation side, wherein an absolute value of a curvature of the second half-transmissive reflective surface is larger than an absolute value of a curvature of the first half-transmissive reflective surface, and wherein the display surface has a convex shape toward the observation side in at least one of two mutually orthogonal sections that include an optical axis of the display optical system.

2. The display apparatus, according to claim 1, wherein each of the two optical elements is made of a resin material.

3. The display apparatus according to claim 1, wherein the following inequality is satisfied:

$$fG1/fG2<0.0$$

where fG1 is a focal length in air of a first optical element on the observation side of the two optical elements, which is calculated from a radius of curvature of a reference spherical surface of the first optical element, and fG2 is a focal length in air of a second optical element on a display element side of the two optical elements, which is calculated from a radius of curvature of a reference spherical surface of the second optical element.

4. The display apparatus according to claim 1, wherein the following inequality is satisfied:

$$1.4\leq Ndp<Ndn\leq 1.9$$

where Ndp is a refractive index for d-line of an optical element with a positive focal length in air of the two optical elements, which is calculated from a radius of curvature of a reference spherical surface, and Ndn is a refractive index for the d-line of an optical element with a negative focal length in air of the two optical elements, which is calculated from a radius of curvature of a reference spherical surface.

5. The display apparatus according to claim 4, wherein the optical element on the observation side of the two optical elements has the positive focal length, and the optical element on a display element side of the two optical elements has a negative focal length.

6. The display apparatus according to claim 1, wherein the following inequality is satisfied:

$$1.0<vdp/vdn\leq 4.0$$

where vdp is an Abbe number based on d-line of an optical element with a positive focal length in air of the two optical elements, which is calculated from a radius of curvature of a reference spherical surface, and vdn is an Abbe number based on the d-line of an optical element with a negative focal length in air of the two optical elements, which is calculated from a radius of curvature.

7. The display apparatus according to claim 1, wherein the following inequality is satisfied:

$$1.0<|Rhm|/f\leq 5.0$$

where Rhm is a radius of curvature of a reference spherical surface of the second half-transmissive reflective surface, and f is a focal length of the display optical system.

8. The display apparatus according to claim 1, wherein the following inequality is satisfied:

$$0.1\leq |Rhm|/|Rp|\leq 2.0$$

where Rhm is a radius of curvature of a reference spherical surface of the second half-transmissive reflective surface, and Rp is a radius of curvature of a reference spherical surface of the display surface.

9. The display apparatus according to claim 1, wherein the display optical system has an aspherical refractive surface that has an inflection point within an optically effective diameter.

10. The display apparatus according to claim 1, wherein the first half-transmissive reflective surface is a flat surface.

11. The display apparatus according to claim 1, wherein the display optical system consists of a cemented lens consisting of the two optical elements as a dioptric element.

12. The display apparatus according to claim 1, wherein an absolute value of an angle between a pupil center ray and a normal to the display surface is 30 degrees or less with an eye relief is 15 mm, at a diopter of 0 diopter, and at an angle of field of 30 degrees.

13. The display apparatus according to claim 1, wherein at least one of the first half-transmissive reflective surface and the second half-transmissive reflective surface includes a polarization-selective half-transmissive reflective element.

* * * * *